United States Patent [19]

Wiercinski

[11] Patent Number: 4,897,313

[45] Date of Patent: Jan. 30, 1990

[54] PRIMER/MEMBRANE WATERPROOFING SYSTEM

[75] Inventor: Robert A. Wiercinski, Somerville, Mass.

[73] Assignee: W. R. Grace & Co.-Conn., New York, N.Y.

[21] Appl. No.: 214,707

[22] Filed: Jul. 1, 1988

[51] Int. Cl.[4] .......................... B32B 11/04; B32B 13/12
[52] U.S. Cl. ..................................... 428/489; 428/688
[58] Field of Search ................ 428/489, 703, 40, 343, 428/355, 514, 688; 106/90, 504, 307; 524/322

[56] References Cited

U.S. PATENT DOCUMENTS

| | | | |
|---|---|---|---|
| 3,333,980 | 8/1967 | McCord | 106/504 |
| 3,625,807 | 11/1969 | Beemer | 428/519 |
| 3,741,856 | 6/1973 | Hurst | 428/489 X |
| 3,853,682 | 12/1974 | Hurst | 428/489 X |
| 3,897,380 | 1/1975 | Walaschek | 524/60 |
| 3,900,102 | 8/1975 | Hurst | 428/40 X |
| 3,936,311 | 2/1976 | Kirst | 106/90 |
| 3,940,540 | 2/1976 | Schmidt | 428/332 |
| 3,951,722 | 4/1976 | Howson | 156/307 |
| 4,151,025 | 4/1979 | Jacobs | 404/31 |
| 4,172,830 | 10/1979 | Rosenberg | 428/343 X |
| 4,283,316 | 8/1981 | Bonsignore | 525/322 |
| 4,362,586 | 12/1982 | Uffner | 428/489 X |
| 4,455,146 | 6/1984 | Noda | 428/355 X |
| 4,597,817 | 1/1986 | Larsen | 524/60 |
| 4,600,657 | 7/1986 | Wegehaupt et al. | 428/489 X |
| 4,731,399 | 3/1988 | Fitzgerald | 428/489 X |
| 4,774,115 | 9/1988 | Ruehl et al. | 428/489 |
| 4,775,567 | 10/1988 | Harkness | 428/489 X |
| 4,789,578 | 12/1988 | Twyford et al. | 428/489 X |

OTHER PUBLICATIONS

Union Carbide Product Information, 1984, pp. 1–6.

*Primary Examiner*—Thomas J. Herbert
*Attorney, Agent, or Firm*—Vincent L. Fabiano; William W. McDowell, Jr.

[57] ABSTRACT

A waterproofing system including a water-based latex primer composition and a waterproofing adhesive membrane. The primer exhibits excellent adhesion to concrete and an excellent surface for adhesion by the waterproofing membrane. The primer is a latex emulsion including butyl acrylate, styrene and acrylonitrile.

7 Claims, No Drawings

PRIMER/MEMBRANE WATERPROOFING SYSTEM

TECHNICAL FIELD

The present invention relates to a waterproofing system for construction surfaces, especially concrete construction surfaces, and more particularly relates to a waterproofing system including a water-based, adhesion-promoting primer and an adhesive waterproofing membrane.

BACKGROUND OF THE INVENTION

It is known to seal surfaces, particularly those of concrete, by forming thereon a membrane of a bituminous composition or the like which is substantially impermeable to moisture and water vapor. (The term "bituminous composition" as used herein refers to compositions containing asphalt, tar or pitch. The term "concrete" refers to portland cement concrete as well as other similar construction materials). Bituminous compositions can be spray applied in a heated, softened state. A much preferred alternative to these spray applied materials are the waterproofing membranes such as Bituthene ®-brand waterproofing membranes of W. R. Grace & Co. Such membranes typically comprise a primary waterproofing layer of rubberized asphalt adhered to a carrier sheet of e.g. plastic film. The membranes are sold in roll form with a release sheet of silicone-coated Kraft paper covering the asphalt adhesive layer.

It is known that adhesion of the rubberized asphalt to the concrete surface is greatly facilitated by the application of a primer to the concrete. Primers currently marketed for us in connection with Bituthene-brand membranes are Bituthene primers P-3000 and P-3100, also products of W. R. Grace & Co. These primers are mixtures of rubbers and resins dissolved in organic solvents.

Primers based on aqueous carriers, rather than organic solvents, are desirable. The presence of organic solvents in the workplace is coming under increasing regulatory scrutiny. Unfortunately, water-based latex compositions, as a general rule, do not remain firmly adhered to construction surfaces when immersed in water; they tend to re-emulsify and lose their desired adhesive properties. Another drawback to latex compositions is their tendency to lose stability below a critical temperature of usually about 40° F. Further, the alkaline nature of concrete limits the choice of polymers in the latex to those that will not hydrolyze under these alkaline conditions.

Accordingly, the objects of the invention are to provide a water-based primer composition that is highly compatible with both concrete surfaces as well as the rubberized asphalt adhesives employed in waterproofing membranes.

DETAILED DESCRIPTION

The foregoing objects are attained by the present waterproofing system including a waterproofing membrane laminate and a water-based primer. Preferred waterproofing membranes are Bituthene-brand waterproofing membrane products of W. R. Grace & Co. These membranes consist of a carrier sheet, preferably an oriented, cross-laminated polyethylene sheet, adhered to a layer of a rubber-modified asphalt ("rubberized asphalt") pressure sensitive adhesive composition. The membranes are supplied in roll form and are easily applied to vertical or horizontal construction surfaces.

The primer compositions of the present system are water-based acrylic latex compositions that can be brushed, rolled or sprayed onto concrete and other construction surfaces. The primer compositions comprise a polymeric component dispersed in a water phase, the polymeric component comprising mostly butyl acrylate (e.g. 40 to 100 wt. %, preferably 70 to 100 wt. %), plus styrene (e.g. 0 to 60 wt. %, preferably 10 to 25 wt. %) and acrylonitrile (e.g. 0 to 10 wt. %, preferably 0 to 5 wt. %). A suitable dispersant as known to those familiar with the latex emulsion art is employed. While the viscosity of the formulated primer can be predetermined by the formulator to fall within the range of 1 to 100 cps or even higher, room temperature, 50 RPM Brookfield viscosity, optimum penetration into the concrete surface and adhesion thereto has been found in the 5 to 20 cps viscosity range.

A particularly preferred latex composition is UCAR (trademark of Union Carbide Corp.) Latex 123. This latex is supplied at a viscosity of approximately 150 cps; consequently, it should be thinned by the addition of water to the desired 5 to 20 cps range.

EXAMPLE

UCAR Latex 123 is thinned to a viscosity of 5 to 20 cps and brushed onto concrete block and allowed to dry. A pressure sensitive waterproofing membrane consisting of a plastic carrier sheet and rubberized asphalt adhesive (Bituthene 3000) is adhered to the primer. After one month, both the adhesion of the primer to the concrete and the adhesion of the membrane to the primer remain excellent.

Although the invention has been described in connection with certain preferred ingredients and embodiments it is not so limited. Variations, within the scope of the appended claims, will be apparent to those skilled in the art.

I claim:

1. A package including a waterproofing membrane and primer composition comprising
   a. a waterproofing membrane comprising a carrier sheet and a rubberized asphalt adhesive thereon, and
   b. a primer composition, adapted to promote adhesion between a concrete construction surface and the waterproofing membrane, comprising a water-based emulsion of a polymeric component comprised of butyl acrylate 40 to 100 wt. %, styrene 0 to 60 wt. %, and acrylonitrile 0 to 10 wt wt. %.

2. A package of claim 1 wherein the primer composition has a viscosity of about 1 to 100 cps.

3. A package of claim 1 wherein the primer composition has a vicosity of from about 5 to 20 cps.

4. A package of claim 1 wherein said polymeric component comprises, by weight, 70 to 100% butyl acrylate, 10 to 25% styrene and 0 to 5% acrylonitrile.

5. A package of claim 4 wherein the primer composition has a viscosity of from about 5 to 20 cps.

6. A waterproofed concrete surface comprising a primer disposed on the surface and an adhesive waterproofing membrane adhered to said primer, said primer comprising a water-based emulsion of a polymeric component comprised of butyl acrylate 40 to 100 wt. %, styrene 0 to 60 wt. %, and acrylonitrile 0 to 10 wt. %.

7. A waterproofed concrete surface of claim 6 wherein the primer comprises, by weight, 70 to 100% butyl acrylate, 10 to 25% styrene and 0 to 5% acrylonitrile.

* * * * *